(12) United States Patent
Fukuoka et al.

(10) Patent No.: US 10,072,621 B2
(45) Date of Patent: Sep. 11, 2018

(54) TANK LID UNIT AND FUEL SUPPLY DEVICE

(71) Applicants: DENSO CORPORATION, Kariya, Aichi-pref. (JP); DENSO KOREA AUTOMOTIVE CORPORATION, Changwon-si, Gyeongsangnam-do (KR)

(72) Inventors: Shingo Fukuoka, Kariya (JP); Kiyoshi Nagata, Kariya (JP); Sanghoon Lee, Changwon-si (KR)

(73) Assignees: DENSO CORPORATION, Kariya (JP); DENSO KOREA AUTOMOTIVE CORPORATION, Changwon-si (KR)

( * ) Notice: Subject to any disclaimer, the term of this patent is extended or adjusted under 35 U.S.C. 154(b) by 76 days.

(21) Appl. No.: 15/327,783

(22) PCT Filed: Jul. 21, 2015

(86) PCT No.: PCT/JP2015/003634
§ 371 (c)(1),
(2) Date: Jan. 20, 2017

(87) PCT Pub. No.: WO2016/013204
PCT Pub. Date: Jan. 28, 2016

(65) Prior Publication Data
US 2017/0211530 A1 Jul. 27, 2017

(30) Foreign Application Priority Data
Jul. 22, 2014 (JP) .................................. 2014-148630

(51) Int. Cl.
*F02M 37/10* (2006.01)
*B60K 15/035* (2006.01)
(Continued)

(52) U.S. Cl.
CPC ......... *F02M 37/103* (2013.01); *B60K 15/035* (2013.01); *H01R 13/5202* (2013.01);
(Continued)

(58) Field of Classification Search
CPC ........... F02M 37/103; F02M 2037/085; B60K 15/035
See application file for complete search history.

(56) References Cited

U.S. PATENT DOCUMENTS 9,745,931 B2 *  8/2017  McGrew ............... F02M 53/00
2005/0100461 A1 *  5/2005  Izutani ................ B01D 35/027
417/423.8

(Continued)

FOREIGN PATENT DOCUMENTS

| JP | 2001-99029 | 4/2001 |
| JP | 2005-158909 | 6/2005 |

(Continued)

*Primary Examiner* — David Hamaoui
*Assistant Examiner* — Kody Kight
(74) *Attorney, Agent, or Firm* — Nixon & Vanderhye PC

(57) ABSTRACT

A circuit housing portion integrally molded above a lid main body portion has a bottom portion, which forms a vent space with the lid main body portion, and a vent hole, which extends through a portion between a protection space and an external space in the side portion. In a terminal, in which an intermediate portion is embedded in a bottom portion to extend between a fuel pump and a drive circuit through the bottom portion, an interface between the bottom portion and the intermediate portion is exposed to a protection space above the vent hole. A liquid-impermeable and gas-permeable membrane is mounted on an outer surface of the side portion to cover the vent hole to allow the fuel vapor to be discharged from the vent hole to the external space and to restrict liquid from entering the vent hole from the external space.

9 Claims, 9 Drawing Sheets

(51) Int. Cl.
  *H01R 13/52*  (2006.01)
  *F02M 37/08*  (2006.01)

(52) U.S. Cl.
  CPC .............. *B60K 2015/03509* (2013.01); *F02M 2037/085* (2013.01)

(56) References Cited

U.S. PATENT DOCUMENTS

| | | | | |
|---|---|---|---|---|
| 2006/0081395 | A1* | 4/2006 | Motoda | F02M 37/103 |
| | | | | 174/151 |
| 2007/0044772 | A1 | 3/2007 | Sakamoto et al. | |
| 2008/0011276 | A1* | 1/2008 | Satoh | F02M 37/106 |
| | | | | 123/509 |
| 2008/0295808 | A1* | 12/2008 | Tateishi | B01D 35/027 |
| | | | | 123/497 |
| 2009/0031995 | A1* | 2/2009 | Tateishi | F02M 37/0082 |
| | | | | 123/509 |
| 2009/0090330 | A1* | 4/2009 | Tateishi | F02M 25/0854 |
| | | | | 123/357 |

FOREIGN PATENT DOCUMENTS

| | | |
|---|---|---|
| JP | 2006-103624 | 4/2006 |
| JP | 2007-56820 | 3/2007 |
| JP | 2011-148364 | 8/2011 |
| JP | 2014-53382 | 3/2014 |

\* cited by examiner

TANK LID UNIT AND FUEL SUPPLY DEVICE

CROSS REFERENCE TO RELATED APPLICATION

This application is the U.S. national phase of International Application No. PCT/JP2015/003634 filed on Jul. 21, 2015 which designated the U.S. and claims priority to Japanese Patent Application No. 2014-148630 filed on Jul. 22, 2014, the entire contents of each of which are incorporated herein by reference.

TECHNICAL FIELD

The present disclosure relates to a tank lid unit and a fuel supply device provided in the tank lid unit.

BACKGROUND ART

Conventionally, in a fuel supply device which supplies a fuel from the inside of a fuel tank to the outside of the fuel tank by a fuel pump, a tank lid unit is provided and is assembled to a through hole of the fuel tank. As a kind of tank lid unit, Patent Literature 1 discloses a tank lid unit in which a drive circuit for driving a fuel pump inside the fuel tank is accommodated.

Specifically, in the tank lid unit disclosed in Patent Literature 1, a circuit housing portion, which partitions a protection space for protecting the drive circuit from an external space of the fuel tank, is integrally molded above a lid main body portion which blocks a through hole of the fuel tank.

PRIOR ART LITERATURES

Patent Literature

Patent Literature 1: JP-A-2001-99029

SUMMARY

Meanwhile, in the tank lid unit disclosed in Patent Literature 1, depending on a resin, which forms the lid main body portion and the circuit housing portion, fuel vapor vaporized from a fuel inside the fuel tank successively is assumed to pass through the lid main body portion and the circuit housing portion above the lid main body portion and to enter the protection space. Since the fuel vapor entering the protection space is in continuous contact with the drive circuit, which is protected by the protection space, the drive circuit is likely to fail. Accordingly, improvement is required.

In view of the above, the inventors have studied a technology, which provides a vent space communicating with an external space between the lid main body portion and the bottom portion of the circuit housing portion. According to this technology, the fuel vapor passing through the lid main body portion is released from the vent space to the external space, and an amount of fuel vapor passing through the bottom portion of the circuit housing portion can be decreased.

However, as a result of new research by the inventors, the inventors have found that entry of the fuel vapor into the protection space is caused not only through the route, through which the fuel vapor passes through the bottom portion of the circuit housing portion, but also through other routes. Other routes are not clearly described in the tank lid unit disclosed in Patent Literature 1. However, in a terminal extending between the fuel pump and the drive circuit through the bottom portion of the circuit housing portion, the intermediate portion of the terminal in the extension direction is embedded in the bottom portion, and thus, the other routes may be formed. That is, since a gap is formed in an interface between the intermediate portion of the terminal in the extension direction and the bottom portion in which the terminal is embedded, the fuel vapor is likely to enter the protection space exposed to the interface through the gap.

It is an object of the present disclosure to produce a tank lid unit in which a failure of the drive circuit is restricted, and a fuel supply device which is provided in the tank lid unit.

A tank lid unit as a first disclosure is a tank lid unit assembled to a through hole of a fuel tank and accommodates a drive circuit for driving a fuel pump inside the fuel tank, comprising: a lid main body portion formed of a transmissive resin through which fuel vapor passes and blocks the through hole; a circuit housing portion integrally molded of the transmissive resin above the lid main body portion and partitions a protection space for protecting the drive circuit from an external space of the fuel tank, and includes a bottom portion which allows a vent space communicating with the external space to be secured between the lid main body portion and the bottom portion, a side portion surrounding the protection space above the bottom portion, and a vent hole extending through a portion between the protection space and the external space in the side portion; a terminal in which an intermediate portion in an extension direction is embedded in the bottom portion so as to extend between the fuel pump and the drive circuit through the bottom portion, and an interface between the bottom portion and the intermediate portion is exposed to the protection space above the vent hole; and a liquid-impermeable and gas-permeable membrane mounted on an outer surface of the side portion facing the external space, to cover the vent hole, to allow the fuel vapor to be discharged from the vent hole to the external space, and to restrict liquid from entering the vent hole from the external space.

According to the first disclosure, the vent space communicating with the external space of the fuel tank is provided between the lid main body portion and bottom portion of the circuit housing portion above the lid main body portion. Therefore, the fuel vapor passing through the lid main body portion is released from the vent space to the external space, and an amount of the fuel vapor passing through the bottom portion of the circuit housing portion can be decreased.

In the first disclosure, in the terminal extending between the fuel pump and the drive circuit through the bottom portion of the circuit housing portion, the intermediate portion of the terminal in the extension direction is embedded in the bottom portion. Accordingly, a gap is formed at an interface between the terminal and the bottom portion in which the intermediate portion of the terminal is embedded, and the fuel vapor may enter the protection space exposed to the interface through the gap. Therefore, according to the first disclosure, the interface between the bottom portion of the circuit housing portion and the intermediate portion of the terminal is exposed to the protection space above the vent hole. Accordingly, since the fuel vapor entering the protection space is introduced into the vent hole positioned below the exposed location of the interface due to a specific gravity of the fuel vapor which is heavier than that of air, the fuel vapor does not easily reach the drive circuit.

According to the first disclosure, the fuel vapor can be discharged from the vent hole extending through a portion between the protection space and the external space in the side portion of the circuit housing portion to the external space via the liquid-impermeable and gas-permeable membrane which covers the vent hole. Accordingly, the fuel vapor entering the protection space is successively emitted from the vent hole to the external space, and the fuel vapor does not easily accumulate in the protection space which protects the drive circuit. According to the first disclosure, liquid is restricted from entering the vent hole from the external space by the liquid-impermeable and gas-permeable membrane which covers the vent hole. Accordingly, liquid in the external space does not easily reach the drive circuit which is protected in the protection space inside the vent hole. In the first disclosure, since the liquid-impermeable and gas-permeable membrane is mounted on the outer face of the side portion of the circuit housing portion facing the external space, even when the liquid-impermeable and gas-permeable membrane is pressed by a liquid pressure in the external space, the liquid-impermeable and gas-permeable membrane does not easily peel off from the outer surface. The liquid-impermeable and gas-permeable membrane which does not easily peel off is capable of exerting a function of allowing discharge of fuel vapor and a function of restricting entry of liquid over a long period of time.

According to the above-described first disclosure, not only fuel vapor inside the fuel tank being in continuous contact with the drive circuit but also liquid in the external space coming into contact with the drive circuit are restricted, and failure of the drive circuit can be restricted.

A fuel supply device as a second disclosure includes: a fuel pump which supplies a fuel from the inside of a fuel tank to the outside of the fuel tank; and the tank lid unit according to the first disclosure.

In this way, according to the fuel supply device of the second disclosure in which the tank lid unit of the first disclosure is provided, failure of the drive circuit can be restricted, and operation reliability of the fuel pump which is driven by the drive circuit can be secured.

DESCRIPTION OF EMBODIMENTS

Figure 1:
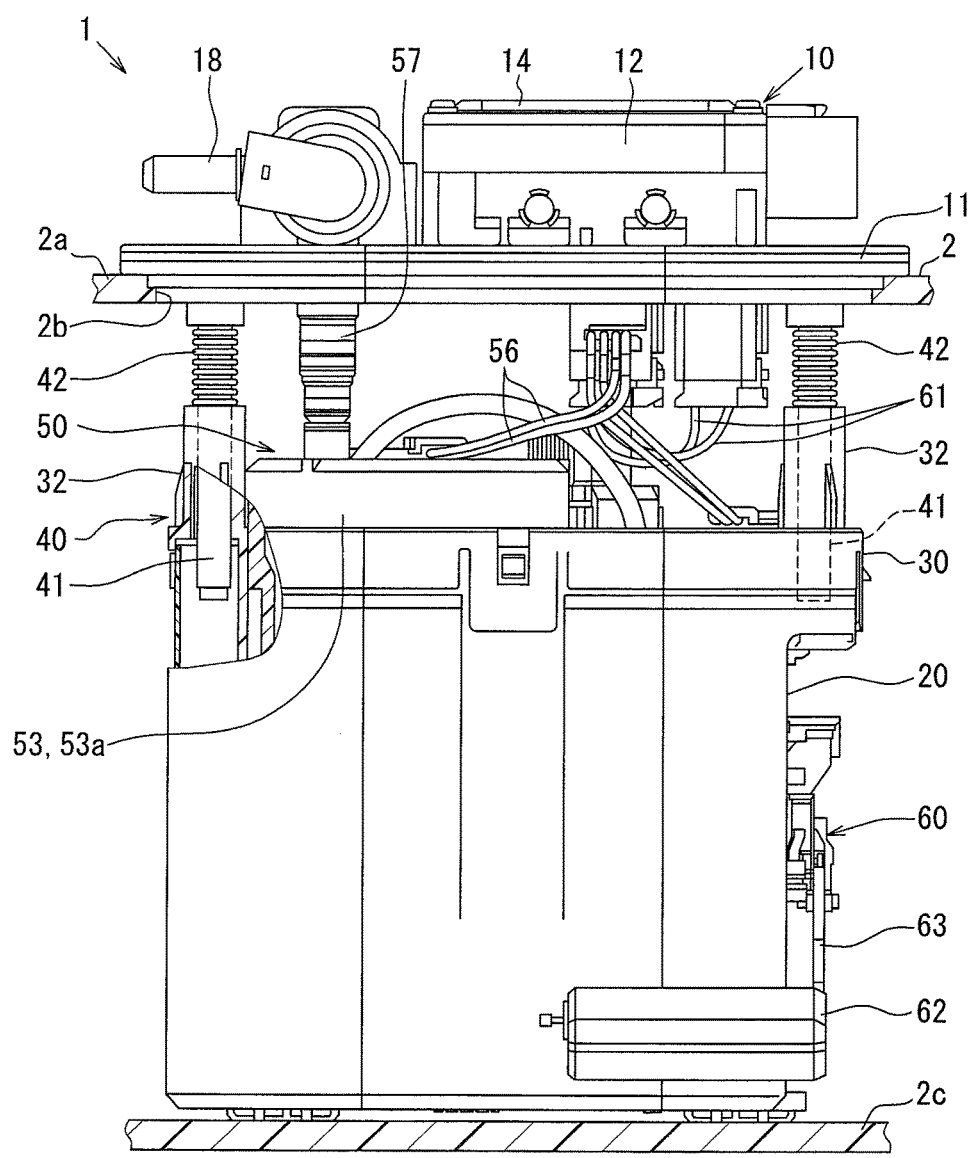
FIG. 1 is a front view showing a fuel supply device according to a first embodiment.

Hereinafter, multiple embodiments of the present disclosure will be described with reference to the drawings. The same reference numerals are denoted to the corresponding elements in the embodiments, and overlapping descriptions thereof may be omitted. When only a portion of a configuration in each embodiment is described, with respect to other portions of the configuration, configurations of other embodiments described in advance can be applied. Configurations clearly described in each embodiment may be combined, and components of multiple embodiments which are not clearly described may be partially combined as long as troubles in the combinations do not occur.

First Embodiment

Figure 2:
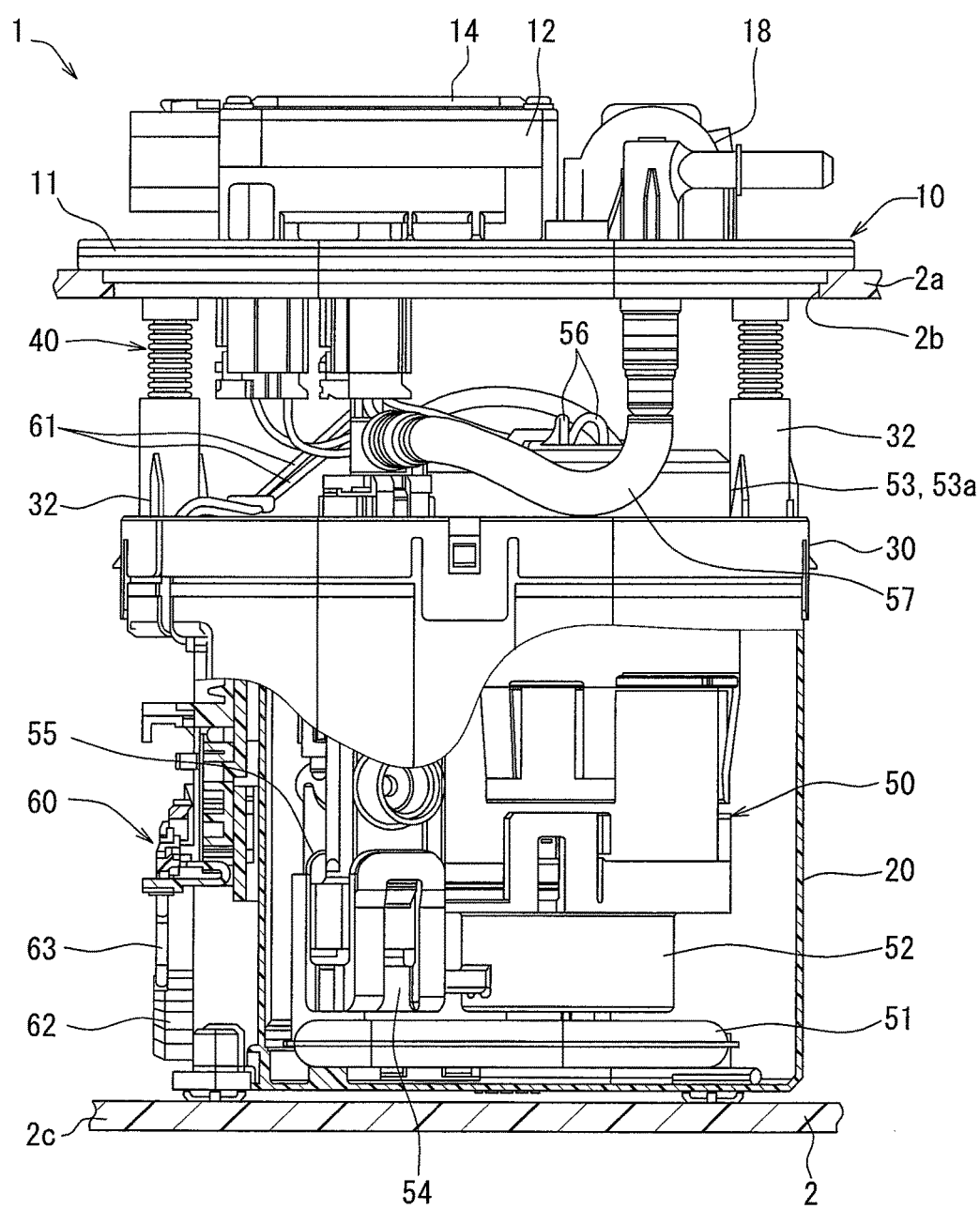
FIG. 2 is a partially sectional rear view showing the fuel supply device of FIG. 1.
Figure 3:
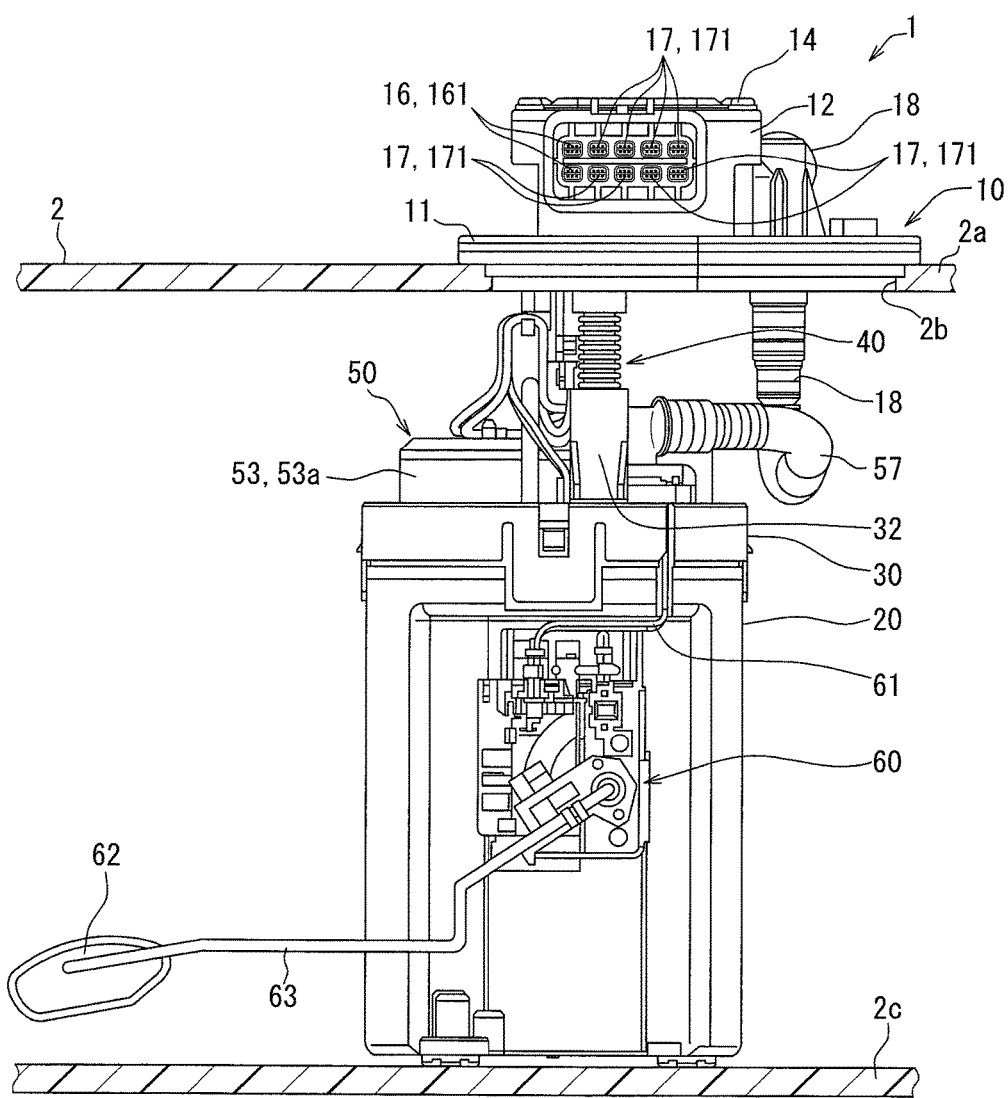
FIG. 3 is a side view showing the fuel supply device of FIG. 1.
Figure 4:
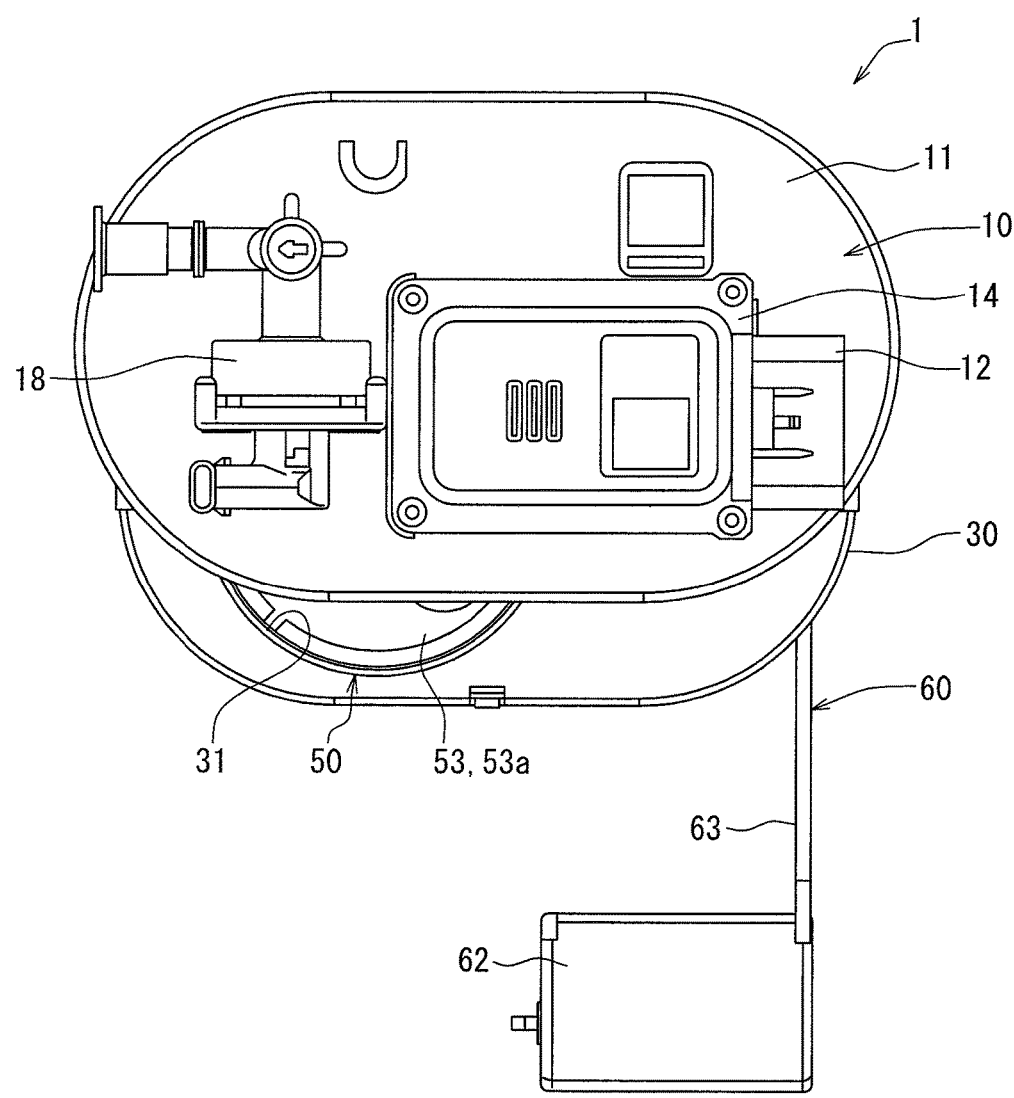
FIG. 4 is a top view showing the fuel supply device of FIG. 1.

As shown in FIGS. 1 to 3, a fuel supply device 1 according to a first embodiment of the present disclosure is mounted on a fuel tank 2 of a vehicle. The fuel supply device 1 supplies a fuel from the inside of the fuel tank 2 to an internal combustion engine outside the fuel tank 2. An up-down direction and a lateral direction in each of FIGS. 1 to 3 showing a state where the fuel supply device 1 is mounted on the fuel tank 2 substantially coincide with a vertical direction and a horizontal direction of the vehicle on a horizontal surface.

(Fundamental Configuration)

First, a fundamental configuration of the fuel supply device 1 will be described. The fuel supply device 1 includes a tank lid unit 10, a sub-tank 20, a holding cover 30, an adjustment mechanism 40, a pump unit 50, and a liquid level sensor 60. Elements 20, 30, 40, 50, and 60 except for the tank lid unit 10 of the fuel supply device 1 are accommodated in the fuel tank 2.

The tank lid unit 10 is formed of a resin in a hollow shape, and is assembled to a through hole 2b which extends through a top plate portion 2a of the fuel tank 2. As shown in FIGS. 1 to 8, the tank lid unit 10 includes a lid main body portion 11, a circuit housing portion 12, a drive circuit 13, a heat-dissipation cover portion 14, a pump terminal 15, a sensor terminal 16, a connection terminal 17, and a fuel pipe portion 18.

As shown in FIGS. 1 to 3, the entire lid main body portion 11 is formed of a resin in an approximately flat plate shape. The lid main body portion 11 is fitted and assembled to the through hole 2b of the top plate portion 2a from the outside, and blocks the through hole 2b above a fuel inside the fuel tank 2. In the state where the lid main body portion 11 blocks the through hole 2b, a fuel vapor which is vaporized from the fuel inside the fuel tank 2 is accumulated above the fuel. A transmissive resin (hereinafter, simply referred to as a "transmissive resin") through which the fuel vapor passes, for example, a polyacetal resin (POM) having excellent fuel resistance properties or the like is employed as a formation resin of the lid main body portion 11. According to the employment of the transmissive resin, the fuel vapor accumulated in the fuel tank 2 can pass through the lid main body portion 11.

Figure 6:
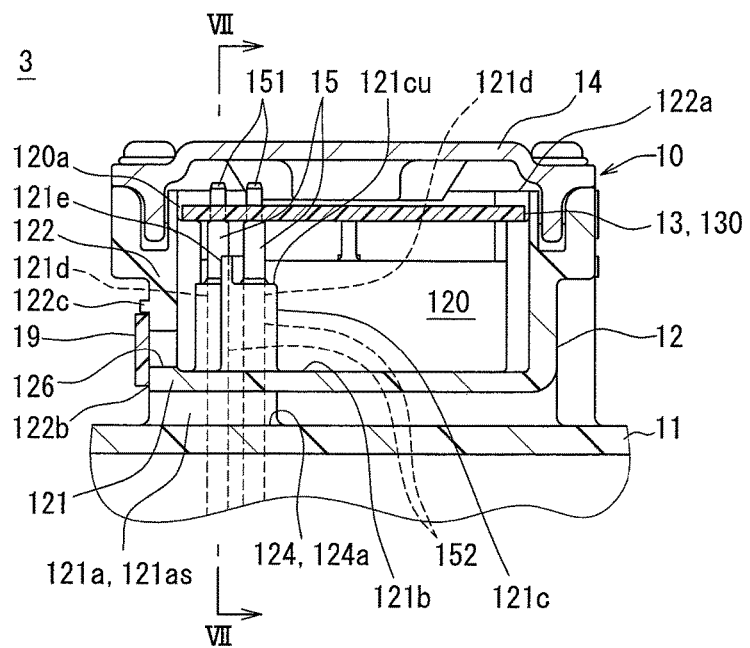
FIG. 6 is a cross-sectional view taken along VI-VI of FIG. 5.
Figure 7:
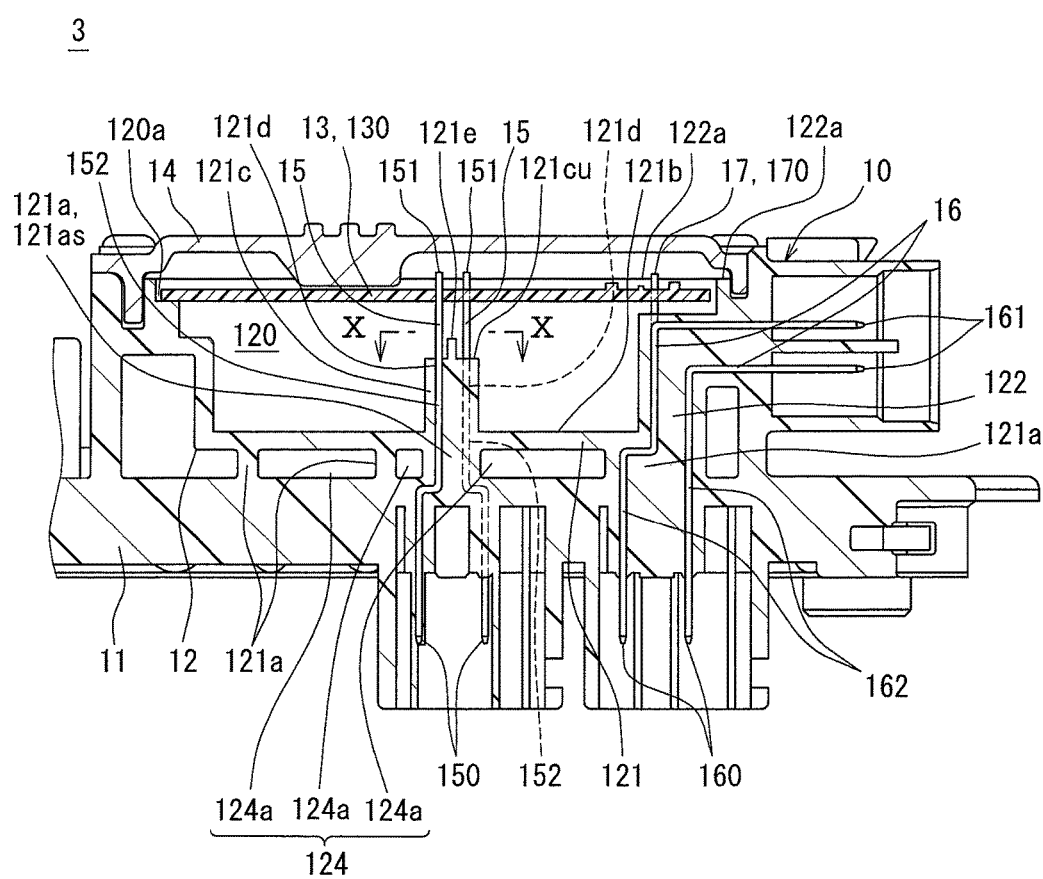
FIG. 7 is a cross-sectional view taken along VII-VII of FIG. 6.

The circuit housing portion 12 is integrally molded with respect to the lid main body portion 11 of the transmissive resin. As shown in FIGS. 6 and 7, the circuit housing portion 12 is formed in a bottomed cup shape having a protection space 120 as an internal space. The circuit housing portion 12 is positioned above the lid main body portion 11 in an external space 3 of the fuel tank 2. According to this positional relationship, in the bottom portion (hereinafter, referred to as a "housing bottom portion") 121 of the circuit housing portion 12, fuel vapor which is accumulated in the fuel tank 2 and passes through the lid main body portion 11 can pass through the portion of the protection space 120.

The drive circuit 13 is an electronic circuit which is accommodated in the protection space 120 to drive a fuel pump 52 (refer to FIG. 2) of the pump unit 50. For example, in the drive circuit 13, multiple circuit elements (not shown) such as an IC, a chip capacitor, or a resistor element are mounted on both surfaces or one surface of a printed wiring circuit board 130. For example, the printed wiring circuit board 130 is a glass epoxy substrate or the like, and is formed in a flat plate shape. The printed wiring circuit board 130 is held to the circuit housing portion 12 by a side portion (hereinafter, referred to as a "housing side portion") 122 which is positioned above the housing bottom portion 121 and surrounds the protection space 120. According to this holding structure, the printed wiring circuit board 130 is positioned at an upper space portion 120*a* which is a distant location separated upward from the housing bottom portion 121 of the protection space 120.

The heat-dissipation cover portion 14 is formed of metal in a lid shape. The heat-dissipation cover portion 14 is fitted and assembled to the upper end edge of the housing side portion 122 of the circuit housing portion 12, and blocks an opening portion 122*a* of the housing side portion 122. Since the heat-dissipation cover portion 14 is in surface contact with a heatful IC (not shown) among the circuit elements mounted on the printed wiring circuit board 130 of the drive circuit 13 via a heat-dissipation gel, the heat-dissipation cover portion 14 is enabled to exert a heat-dissipation function. The heat-dissipation cover portion 14 having the above-described configuration and the circuit housing portion 12 cooperatively cover the protection space 120, and liquid-tightly and air-tightly separate the protection space 120 of the fuel tank 2 from the external space 3 so as to protect the drive circuit 13.

The pump terminal 15 is formed of metal in an elongated flat-plate shape having a step, and a pair of pump terminals 15 is provided to extend in the vertical direction with a gap to each other. An intermediate portion 152 between end portions 150 and 151 in the extension direction of each pump terminal 15 is embedded in the lid main body portion 11 and the housing bottom portion 121 by a transmissive resin using a metal insert molding. One end portion 150 of each pump terminal 15 protrudes to the lower portion which is the inside of the fuel tank 2, and is provided to be electrically connected to the fuel pump 52 of the pump unit 50. The other end portion 151 of each pump terminal 15 protrudes from the housing bottom portion 121 to the protection space 120 above the housing bottom portion 121, and is electrically connected to the printed wiring circuit board 130 in the upper space portion 120*a* of the space 120. According to this configuration, each pump terminal 15 extends between the fuel pump 52 and the drive circuit 13 through the lid main body portion 11 and the housing bottom portion 121. For example, as a formation metal of each pump terminal 15, tin plated brass having excellent fuel resistance properties or the like is adopted. The upper end portion 151 of the terminal 15 extends through a through hole of the printed wiring circuit board 130 upward from the lower portion and is soldered to the printed wiring circuit board 130, and the electric connection between each pump terminal 15 and the printed wiring circuit board 130 is made.

As shown in FIGS. 3 and 7, the sensor terminal 16 is formed of metal in an elongated flat-plate shape having an approximately L shape, and a pair of sensor terminals 16 are provided to extend in the vertical direction with a gap to each other. An intermediate portion 162 between end portions 160 and 161 in the extension direction of each sensor terminal 16 is embedded in the lid main body portion 11 and the housing bottom portion 121 with a transmissive resin using a metal insert molding. One end portion 160 of each sensor terminal 16 protrudes to the lower portion which is the inside of the fuel tank 2, and is provided to be electrically connected to a liquid level sensor 60. The other end portion 161 of each sensor terminal 16 protrudes to a side portion exposed to the external space 3, and can be electrically connected to an engine control circuit (not shown) of an internal combustion engine. According to this configuration, a sensor signal of the liquid level sensor 60 is output to the engine control circuit. For example, similarly to the pump terminal 15, as a formation metal of each sensor terminal 16, tin plated brass or the like is adopted.

Figure 8:
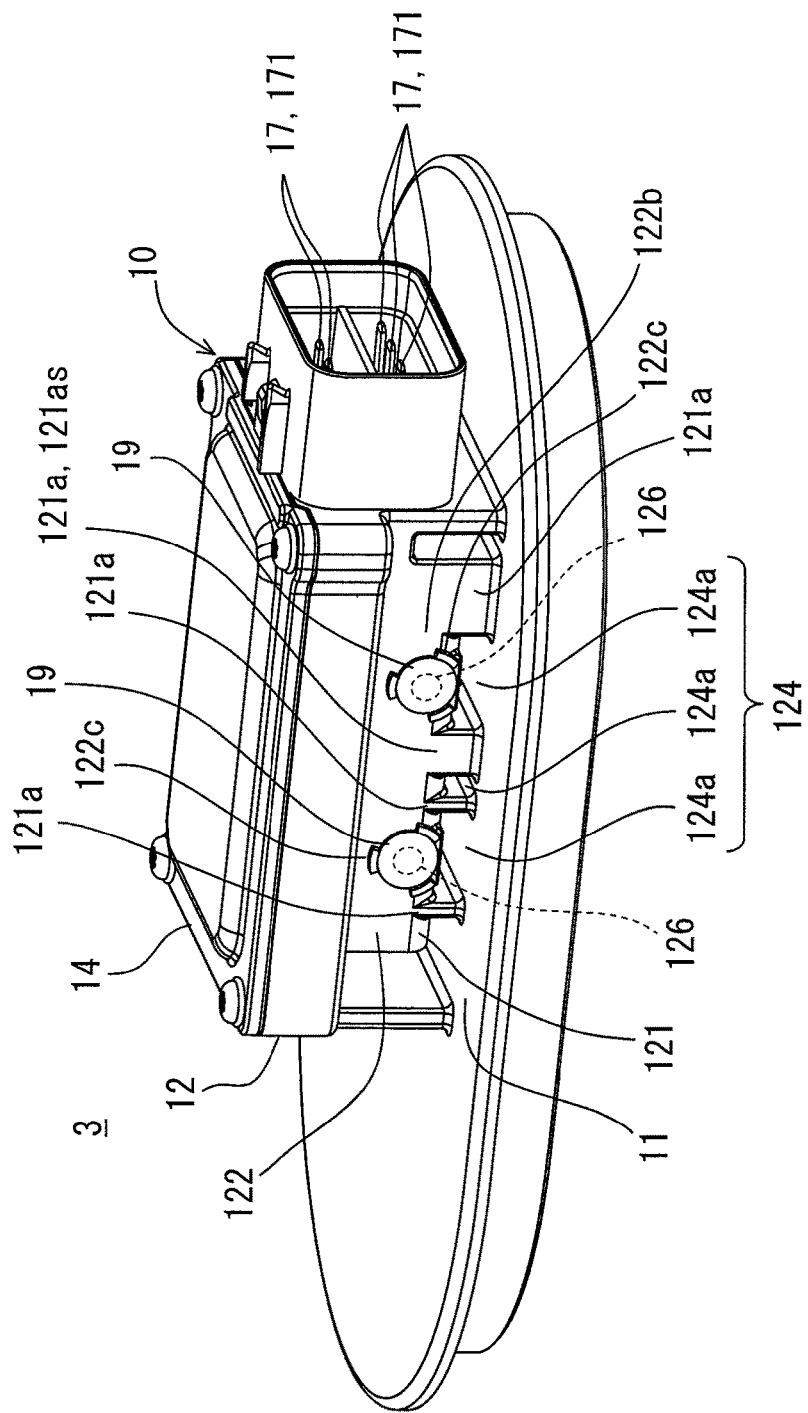
FIG. 8 is a perspective view showing the tank lid unit of FIG. 1 in an enlarged manner.

As shown in FIGS. 3, 7, and 8, the connection terminal 17 is formed of metal in an elongated flat-plate shape having an approximately L shape, and multiple connection terminals 17 are provided to laterally extend with gaps to each other. An intermediate portion between end portions 170 and 171 in the extension direction of each connection terminal 17 is embedded in the housing side portion 122 by a transmissive resin using a metal insert molding. One end portion 170 of each connection terminal 17 protrudes from the housing side portion 122 to the inside protection space 120, and is provided to be electrically connected to the drive circuit 13 in the protection space 120. The other end portion 171 of each connection terminal 17 protrudes to a side portion exposed to the external space 3, and can be electrically connected to the engine control circuit. According to this configuration, driving of the fuel pump 52 is controlled via the drive circuit 13 according to an instruction from the engine control circuit. For example, similarly to the pump terminal 15, as a formation metal of each connection terminal 17, tin plated brass or the like is adopted.

As shown in FIGS. 1 to 4, the fuel pipe portion 18 is integrally molded with respect to the lid main body portion 11 using a transmissive resin. The fuel pipe portion 18 protrudes downward from the lid main body portion 11 in the fuel tank 2, and is provided so as to be connected to a fuel filter 53 on the downstream side of the fuel pump 52 of the pump unit 50. The fuel pipe portion 18 protrudes from the lid main body portion 11 to the external space 3 above the lid main body portion 11, and is connected to a connection pipe (not shown) of the internal combustion engine. According to this configuration, a fuel which is supplied from the fuel pump 52 described in detail below through the fuel filter 53 is introduced into the internal combustion engine outside the fuel tank 2.

As shown in FIGS. 1 to 3, the sub-tank 20 is formed of a resin in a bottomed cup shape. The sub-tank 20 is installed on a bottom portion 2*c* of the fuel tank 2. The sub-tank 20 stores a fuel which is transferred from the inside of the fuel tank 2 by a jet pump 55 of the pump unit 50.

As shown in FIGS. 1 to 4, the holding cover 30 is formed of a resin in a lid shape. The holding cover 30 is fitted and assembled to the upper end edge of the sub-tank 20. According to this fitting shape, the holding cover 30 blocks the opening portion of the sub-tank 20 in the fuel tank 2. The holding cover 30 includes a holding hole 31 which extends through the holding cover 30 in the vertical direction. The holding cover 30 includes accommodation portions 32 in a tubular form extending upward on both sides of the holding hole 31.

As shown in FIG. 1, the adjustment mechanism 40 includes a pair of supports 41 and a pair of resilient members 42. Each support 41 is formed in a tubular form of metal and is provided so as to extend in the vertical direction. The upper end portion of the each support 41 is mounted to the lower portion of the lid main body portion 11. Each support 41 is inserted into the corresponding accommodation portion 32 below the upper end portion. According to this insertion structure, each support 41 is slidable with respect to the holding cover 30 in the vertical direction. Each resilient member 42 is formed of a metal coil spring, and is interposed between the corresponding accommodation portion 32 and the lid main body portion 11. Each resilient member 42 is compressively and resiliently deformed according to a relative position between the accommodation portion 32 and the lid main body portion 11, and a restoring force is generated. According to the generation of the restoring force, each resilient member 42 presses the sub-tank 20 which is integrally connected with respect to the holding cover 30 toward the bottom portion 2c which is the lower portion of the fuel tank 2.

As shown in FIG. 2, the pump unit 50 is accommodated in the sub-tank 20 except for the upper portion of the pump unit 50. The pump unit 50 includes a suction filter 51, the fuel pump 52, a fuel filter 53, a pressure regulator 54, and the jet pump 55.

The suction filter 51 is provided on the lowermost portion of the pump unit 50. The suction filter 51 is connected to an intake port of the fuel pump 52. The suction filter 51 filters the fuel suctioned from the inside of the sub-tank 20 to the fuel pump 52 and removes large foreign matter in the fuel. The fuel pump 52 is provided above the suction filter 51 in the pump unit 50. The fuel pump 52 is electrically connected to each pump terminal 15 via a flexible wire 56 which is freely bent. According to this electric connection, the fuel pump 52 is subjected to a drive control from the drive circuit 13 so as to be operated, and the fuel suctioned from the suction filter 51 is pressed and ejected.

As shown in FIGS. 1 to 4, the fuel filter 53 is provided in the vicinity of the fuel pump 52 in the pump unit 50. In the fuel filter 53, for example, a filter element (not shown) such as a honeycomb filter medium is accommodated in a filter case 53a. The filter case 53a is held by the inner peripheral portion of the holding hole 31 in a state where the filter case 53a extends through the holding cover 30 in the vertical direction. The filter case 53a is connected to a discharge port of the fuel pump 52, and is connected to the fuel pipe portion 18 via a flexible tube 57 which is freely bent. According to this configuration, the fuel filter 53 filters the fuel which is ejected from the fuel pump 52 into the filter case 53a and flows toward the fuel pipe portion 18, and removes minute foreign matter in the fuel.

As shown in FIG. 2, the pressure regulator 54 is provided on the side of the fuel filter 53 in the pump unit 50. The pressure regulator 54 is connected to the formation portion of the route of the filter case 53a which is directed to the fuel pipe portion 18. The pressure regulator 54 adjusts a pressure of a fuel which is supplied from the fuel filter 53 to the fuel pipe portion 18. The jet pump 55 is connected to a discharge port through which an excess fuel is discharged when a pressure is adjusted by the pressure regulator 54. The jet pump 55 generates a negative pressure by injection of the excess fuel discharged from the pressure regulator 54, and the fuel in the fuel tank 2 is transferred to the sub-tank 20.

As shown in FIGS. 1 to 4, the liquid level sensor 60 is fitted to and mounted on the outer peripheral portion of the sub-tank 20. In the present embodiment, the liquid level sensor 60 is a sender gauge, and is electrically connected to each sensor terminal 16 via a flexible wire 61 which is freely bendable. According to this electric connection, the liquid level sensor 60 detects a rotation angle generated by a rotation of an arm 63 according to a vertical movement of a float 62 which floats on the fuel in the fuel tank 2. Since the rotation angle of the arm 63 follows the liquid level height of the fuel in the fuel tank 2, the liquid level sensor 60 outputs a sensor signal indicating the liquid level height to each sensor terminal 16.

(Circuit Housing Portion and Related Structure thereof)

Next, among the elements included in the tank lid unit 10, particularly, the circuit housing portion 12 and the liquid-impermeable and gas-permeable membrane 19 which is the related structure thereof will be described in detail.

As shown in FIGS. 5 to 8, the housing bottom portion 121 is provided such that a vent space 124 is secured between the circuit housing portion 12 and the lid main body portion 11 on the lower side of the circuit housing portion 12. The housing bottom portion 121 includes multiple rib portions 121a which laterally divide the lower vent space 124 and are connected to the lid main body portion 11. According to the division structure, the vent space 124 forms division space portions 124a at locations between which the rib portions 121a are laterally interposed. The division space portion 124a of each location opens toward the external space 3 so as to communicate with the space 3. In the present embodiment, the intermediate portion 152 of each pump terminal 15 is embedded in one specific rib portion 121as among the rib portions 121a facing the division space portions 124a of each location.

Figure 10:
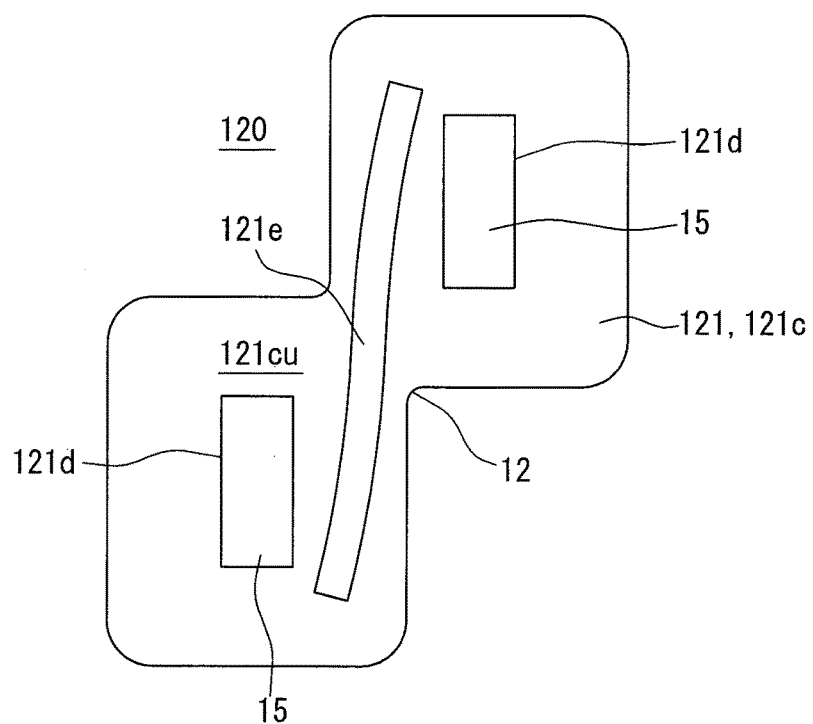
FIG. 10 is a view when viewed from line X-X of FIG. 7.

As shown in FIGS. 6, 7, and 10, the housing bottom portion 121 includes an extension portion 121c which extends upward from the lowermost inner surface 121b facing the protection space 120. In the present embodiment, in the extension portion 121c which is positioned immediately above the specific rib portion 121as, the intermediate portion 152 is embedded in any pump terminal 15 serving as a specific terminal. According to the embedded aspect, the interface 121d, which is provided between the extension portion 121c and the intermediate portion 152 of the each pump terminal 15 through the specific rib portion 121as, is exposed to the protection space 120 on the upper end surface 121cu which is positioned below the printed wiring circuit board 130.

Figure 9:
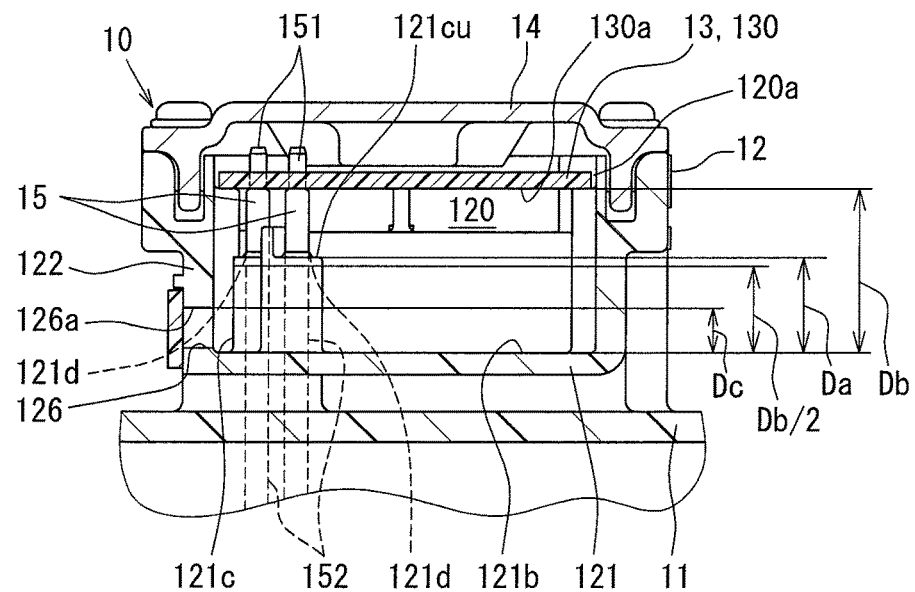
FIG. 9 is a schematic view for explaining characteristics of the tank lid unit of FIG. 1.

As shown in FIG. 9, the upper space portion 120a, in which the printed wiring circuit board 130 is provided in the protection space 120 and which is electrically connected to the end portion 151 of each pump terminal 15, is positioned above the upper end surface 121cu which is the exposed location of the interface 121d. A separation distance Da, by which the upper end surface 121cu is distant from the lowermost inner surface 121b of the housing bottom portion 121, is set so as to be greater than Db/2 which is half of a separation distance Db, by which a lower mounting surface 130a of the printed wiring circuit board 130 is distant from the lowermost inner surface 121b.

As shown in FIGS. 6, 7, and 10, the housing bottom portion 121 includes a protrusion wall portion 121e which protrudes upward from the upper end surface 121cu, from which the interface 121d of the extension portion 121c is exposed. The protrusion wall portion 121e is formed in a waved plate shape with a gap in the lateral direction between the intermediate portions 152 of the pump terminals 15. The protrusion wall portion 121e is formed to have a protrusion height which does not reach the printed wiring circuit board 130 positioned at the upper space portion 120a provided on the upper portion.

Figure 5:
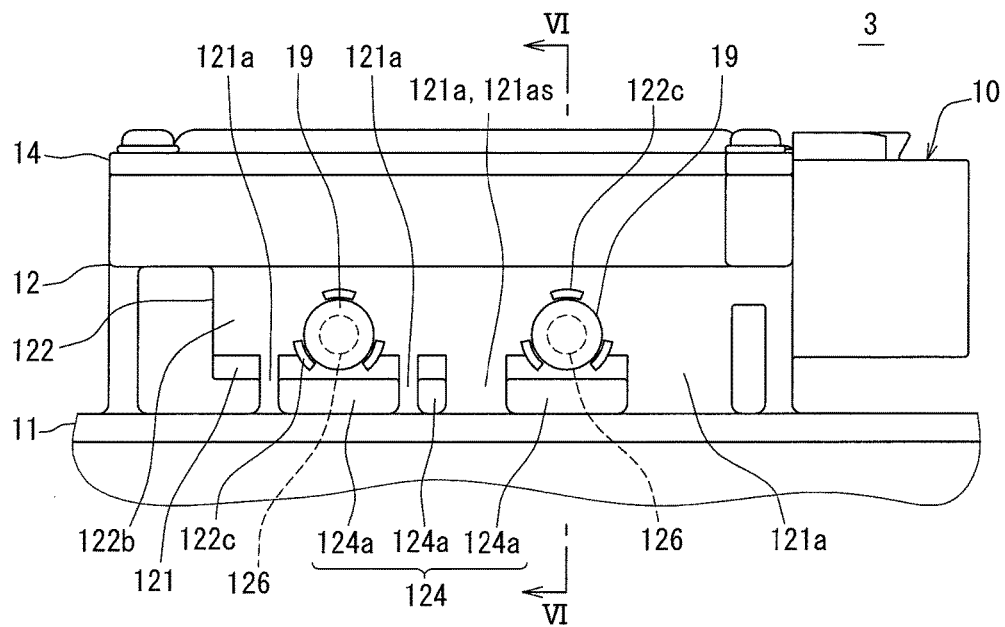
FIG. 5 is a front view showing a tank lid unit of FIG. 1 in an enlarged manner.

As shown in FIGS. 5, 6, and 8, the circuit housing portion 12 includes a vent hole 126 which extends through the housing side portion 122 between the protection space 120 and the external space 3. A pair of vent holes 126 is formed in straightly tubular shapes and is provided so as to be laterally arranged. An opening area of each vent hole 126 on the external space 3 side is set so as to be smaller than an opening area of the vent space 124, that is, the total area of the opening areas of the division space portions 124a. As shown in FIG. 9, a separation distance Dc, by which a topmost portion 126a of each vent hole 126 is distant from the lowermost inner surface 121b, is set so as to be smaller than Db/2 which is half of the separation distance Db by which the lower mounting surface 130a of the printed wiring circuit board 130 is distant from the lowermost inner surface 121b. According to the latter setting, the interface 121d between the intermediate portion 152 of each pump terminal 15 and the extension portion 121c of the housing bottom portion 121 is further above the lowermost inner surface 121b than each vent hole 126.

As shown in FIGS. 5, 6, and 8, the liquid-impermeable and gas-permeable membrane 19 is formed of elastomer in a circular thin-film shape. A pair of liquid-impermeable and gas-permeable membranes 19 is provided so as to respectively correspond to the vent holes 126. Each liquid-impermeable and gas-permeable membrane 19 has a surface area which is greater than the opening area of the corresponding vent hole 126 on the external space 3 side. Since each liquid-impermeable and gas-permeable membrane 19 is mounted on the outer surface 122b of the housing side portion 122 facing the external space 3, the liquid-impermeable and gas-permeable membrane 19 covers the entire opening of the corresponding vent hole 126 on the side of the external space 3. Each liquid-impermeable and gas-permeable membrane 19 has multiple micro-pores of approximately 1 μm so as to achieve both gas permeability which allows discharging of the fuel vapor from the corresponding vent hole 126 to the external space 3 and liquid impermeability which restricts liquid from entering the corresponding vent hole 126. For example, as formation elastomer of each liquid-impermeable and gas-permeable membrane 19, a material having transmissivity with respect to fuel vapor which is higher than transmissivity with respect to water as the liquid is employed. Specifically, elastomer in which a polytetrafluoroethylene film and polyurethane polymer are combined or the like is adopted as the formation elastomer of each liquid-impermeable and gas-permeable membrane 19. For example, mounting of each liquid-impermeable and gas-permeable membrane 19 on the outer surface 122b is continuously made along the opening edge portion of the corresponding vent hole 126 by welding or the like. In the present embodiment, each liquid-impermeable and gas-permeable membrane 19 is held from the outer peripheral side by multiple holding guides 122c which are formed to protrude from the outer surface 122b of the housing side portion 122.

(Effects)

Next, effects of the above-described first embodiment will be described.

According to the first embodiment, the vent space 124 communicating with the external space 3 of the fuel tank 2 is provided between the lid main body portion 11 and the housing bottom portion 121 positioned above the lid main body portion 11. Accordingly, since the fuel vapor passing through the lid main body portion 11 is released from the vent space 124 to the external space 3, the amount of the fuel vapor passing through the housing bottom portion 121 decreases.

In the first embodiment, in the pump terminal 15 extending between the fuel pump 52 and the drive circuit 13 through the housing bottom portion 121, the intermediate portion 152 in the extension direction is embedded in the bottom portion 121. Accordingly, since a gap is formed in the interface 121d between the intermediate portion 152 and the housing bottom portion 121 in which the intermediate portion 152 is embedded, the fuel vapor may enter the protection space 120 exposed from the interface 121d through the gap. Therefore, according to the first embodiment, the interface 121d between the housing bottom portion 121 and the intermediate portion 152 is exposed to the protection space 120 above the vent hole 126. Accordingly, since the fuel vapor entering the protection space 120 is introduced into the vent hole 126 positioned below the exposed location of the interface 121d due to the specific weight of the fuel vapor which is heavier than that of air, the fuel vapor does not easily reach the drive circuit 13.

According to the first embodiment, the liquid-impermeable and gas-permeable membrane 19, which covers the vent hole 126 extending through the portion of the housing side portion 122 between the protection space 120 and the external space 3, allows the discharging of the fuel vapor from the vent hole 126 to the external space 3. Accordingly, the fuel vapor entering the protection space 120 is successively emitted from the vent hole 126 to the external space 3, and the fuel vapor does not easily accumulate in the protection space 120 which protects the drive circuit 13. According to the first embodiment, the liquid-impermeable and gas-permeable membrane 19 covering the vent hole 126 restricts liquid from entering from the external space 3 to the vent hole 126. Accordingly, liquid such as water in the external space 3 does not easily reach the drive circuit 13 which is protected in the protection space 120 inside the vent hole 126. According to the first embodiment, since the liquid-impermeable and gas-permeable membrane 19 is mounted on the outer surface 122b of the housing side portion 122 facing the external space 3, even when the liquid-impermeable and gas-permeable member 19 is pressed by a liquid pressure of the external space 3, the liquid-impermeable and gas-permeable membrane 19 does not easily peel off from the outer surface 122b. In this way, the liquid-impermeable and gas-permeable membrane 19 which does not easily peel off is capable of exerting a function of allowing discharge of fuel vapor and a function of restricting entry of liquid over a long period of time.

According to the tank lid unit 10 of the above-described first embodiment, not only fuel vapor inside the fuel tank 2 being in continuous contact with the drive circuit 13 but also liquid in the external space 3 being in contact with the drive circuit 13 are restricted, and failure of the drive circuit 13 can be restricted. According to the fuel supply device 1 including the tank lid unit 10, failure of the drive circuit 13 can be restricted, and operation reliability of the fuel pump 52 which is driven by the drive circuit 13 can be secured.

According to the first embodiment, since the vent space 124 is provided between the housing bottom portion 121 and the lid main body portion 11 below the housing bottom portion 121, heat generated by the drive circuit 13 above the bottom portion 121 is not easily transferred to the lid main body portion 11. Accordingly, the lid main body portion 11 can be restricted from being heat-deformed, and fuel vapor can be restricted from leaking from a portion between the lid main body portion 11 and the through hole 2b.

In addition to the above-described effects, the topmost portion 126a of the vent hole 126 is distant from the lowermost inner surface 121b of the housing bottom portion 121 so as to have the distance Dc which is smaller than half of the separation distance Db of the drive circuit 13 with respect to the lowermost inner surface 121b, and the exposed location of the interface 121d is distant from the lowermost inner surface 121b of the housing bottom portion 121 so as to have the distance Da which is greater than half of the separation distance Db. Accordingly, the exposed location of the interface 121d, which is positioned farther from the lowermost inner surface 121b than half of the separation distance Db, can be correctly secured above the vent hole 126 which is positioned to be closer to the lowermost inner surface 121b than half of the distance Db. Therefore, the fuel vapor entering the protection space 120 through the gap of the interface 121d is restricted from being in contact with the drive circuit 13, and reliability in failure restriction effects of the drive circuit 13 can be increased.

According to the first embodiment, the drive circuit 13, which is provided at the separation location of the protection space 120 distant from the housing bottom portion 121 above the exposed location of the interface 121d, is electrically connected to the pump terminal 15. Accordingly, fuel vapor does not easily reach the electric connection portion between the drive circuit 13 and the pump terminal 15 through the gap of the interface 121d exposed to the lower portion of the electric connection portion. Accordingly, the fuel vapor can be restricted from being in contact with the electric connection portion between the drive circuit 13 and the pump terminal 15, and failures of the drive circuit 13 can be avoided.

According to the first embodiment, the exposed location of the interface 121d between the extension portion 121c of the housing bottom portion 121, which extends upward from the lowermost inner surface 121b facing the protection space 120, and the intermediate portion 152 is further above the lowermost inner surface 121b than the vent hole 126. Accordingly, the fuel vapor entering the protection space 120 through the gap of the interface 121d is reliably restricted from reaching the drive circuit 13, and reliability in failure restriction effects of the drive circuit 13 can be increased.

According to the first embodiment, the opening area of each vent hole 126 on the external space 3 side is smaller than the opening area of the vent space 124. Accordingly, in the liquid-impermeable and gas-permeable membrane 19 which is mounted on the outer surface 122b of the housing side portion 122 facing the external space 3, the size of the liquid-impermeable and gas-permeable membrane 19 required for covering the vent hole 126 can be decreased as much as possible. Since the opening area of the vent space 124 is greater than the opening area of each vent hole 126, with respect to the fuel vapor passing through the lid main body portion 11, the amount of the fuel vapor which is released through the vent space 124 can be increased. According to the increase of the released fuel vapor, since the amount of the fuel vapor which is not released and passes through the housing bottom portion 121 can be decreased, along with the effects between the vent hole 126 and the liquid-impermeable and gas-permeable membrane 19, a failures of the drive circuit 13 due to transmitted vapor can be restricted.

According to the first embodiment, the intermediate portion 152 passes the rib portion 121a of the housing bottom portion 121, and the interface 121d is exposed to the protection space 120. Since the rib portion 121a divides the vent space 124 and is connected to the lid main body portion 11, the circuit housing portion 12, in which strength is decreased due to existence of the space 124, can be reinforced using the rib portion through which the intermediate portion 152 passes. Accordingly, the shape of the protection space 120 which protects the drive circuit 13 is maintained by the circuit housing portion 12, and failures of the drive circuit 13 due to deformation of the housing portion 12 can be restricted.

According to the first embodiment, the protrusion wall portion 121e is formed between the multiple pump terminals 15 positioned with gaps so as to protrude toward the portion above the exposed location of the interface 121d between the intermediate portion 152 of the pump terminal 15 and the housing bottom portion 121. Accordingly, if liquid inside the external space 3 enters the protection space 120, the distance for which the liquid entering the portion between the pump terminals 15 flows along the surface of the housing bottom portion 121 can be increased by the protrusion of the protrusion wall portion 121e. Therefore, an insulation state between the pump terminals 15 can be restricted from decreasing due to liquid, and failures of the drive circuit 13 can be restricted.

Second Embodiment

Figure 11:
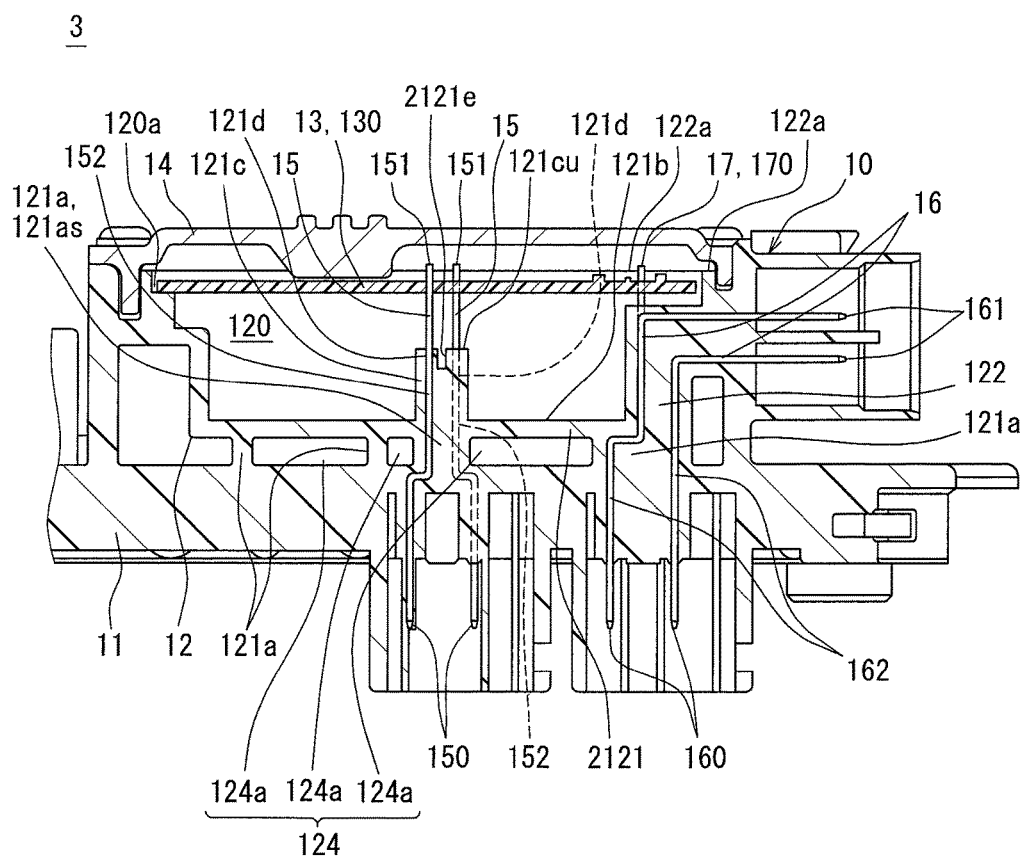
FIG. 11 is a view showing a tank lid unit of a fuel supply device according to a second embodiment in an enlarged manner, and is a cross-sectional view corresponding to FIG. 7.

A second embodiment of the present disclosure shown in FIG. 11 is a modification example of the first embodiment. A housing bottom portion 2121 of the second embodiment includes a recessed wall portion 2121e which protrudes downward from the upper end surface 121cu of the extension portion 121c exposed from the interface 121d. The recessed wall portion 2121e is formed in a rectangular groove shape between the intermediate portions 152 of the pump terminals 15 which are laterally provided with a gap. The recessed wall portion 2121e is formed so as to have a depth which does not reach the lowermost inner surface 121b.

According to the second embodiment, the recessed wall portion 2121e is formed between the multiple pump terminals 15 positioned with gaps so as to be recessed toward the portion below the exposed location of the interface 121d between the intermediate portion 152 of the terminal 15 and the housing bottom portion 121. Accordingly, if liquid inside the external space 3 enters the protection space 120, the distance for which the liquid entering the portion between the pump terminals 15 flows along the surface of the housing bottom portion 121 can be increased by the recessed portion of the recessed wall portion 2121e. Therefore, an insulation state between the pump terminals 15 can be restricted from decreasing due to liquid, and failures of the drive circuit 13 can be restricted. Other effects can be exerted according to principles similar to those of the first embodiment.

Other Embodiments

Hereinbefore, multiple embodiments of the present disclosure are described. However, the present disclosure is not interpreted to be limited to the embodiments, and various embodiments and combinations thereof may be applied within a scope which does not depart from the gist of the present disclosure.

Specifically, in a first modification example with respect to the first and second embodiments, for example, the protection space 120 may be filled with a filler such as an epoxy resin which protects the drive circuit 13. In this case, according to principles similar to those of the first and second embodiments, fuel vapor and liquid can be restricted from reaching the drive circuit 13 through each of a gap between the circuit housing portion 12 and the filler and the vent hole 126. In this case, the other vent hole 126 may not be covered by the liquid-impermeable and gas-permeable membrane 19, and the other vent hole 126 may be covered by the same transmissive resin as a liquid-impermeable film without having gas permeability or the formation resins of the elements 11 and 12.

In a second modification example with respect to the first and second embodiment, the opening area of each vent hole 126 on the external space 3 side may be set so as to be greater than the opening area (the total area of the opening areas of the division space portions 124a) of the vent space 124. In a third modification example with respect to the first and second embodiments, one vent hole 126 or multiple vent holes 126 may be provided in addition to the pair of vent holes 126 being provided. In a fourth modification example with respect to the first and second embodiments, one liquid-impermeable and gas-permeable membrane 19 or multiple liquid-impermeable and gas-permeable membranes 19 may be provided in addition to the pair of liquid-impermeable and gas-permeable membranes 19 being provided.

In a fifth modification example with respect to the first and second embodiments, one pump terminal 15 or multiple pump terminals 15 may be provided in addition to the pair of pump terminals 15 being provided. When the number of the pump terminals 15 is set to three or more, the protrusion wall portion 121e or the recessed wall portion 2121e may be provided on only a portion of the location between the pump terminals 15. In this case, among three or more pump terminals 15, only the terminal 15 in which the protrusion wall portion 121e or the recessed wall portion 2121e is provided therebetween corresponds to the specific terminal.

In a sixth modification example with respect to the first and second embodiments, the protrusion wall portion 121e or the recessed wall portion 2121e may not be provided. In a seventh modification example with respect to the first and second embodiments, the rib portion 121a which divides the vent space 124 may not be provided. In an eighth modification example with respect to the first and second embodiments, multiple rib portions 121a may be adopted as the specific rib portion 121as through the pump terminal 15.

In a ninth modification example with respect to the first and second embodiments, as long as the interface 121d is exposed to a portion above the vent hole 126, the separation distance Dc of the topmost portion 126a and the separation distance Da of the exposed location may be set so as to be greater than half of the separation distance Db of the drive circuit 13. Alternatively, in a tenth modification example with respect to the first and second embodiments, as long as the interface 121d is exposed to a portion above the vent hole 126, the separation distance Dc of the topmost portion 126a and the separation distance Da of the exposed location may be set so as to be smaller than half of the separation distance Db of the drive circuit 13.

The invention claimed is:

1. A tank lid unit assembled to a through hole of a fuel tank and accommodating a drive circuit for driving a fuel pump inside the fuel tank, comprising:
a lid main body portion formed of a transmissive resin, which causes fuel vapor to pass therethrough, and blocking the through hole;
a circuit housing portion integrally molded of the transmissive resin above the lid main body portion and partitioning a protection space for protecting the drive circuit from an external space of the fuel tank, and including
a bottom portion forming a vent space communicating with the external space and located between the lid main body portion and the bottom portion,
a side portion surrounding the protection space above the bottom portion, and
a vent hole extending through a portion between the protection space and the external space in the side portion;
a terminal in which
an intermediate portion in an extension direction is embedded in the bottom portion to extend between the fuel pump and the drive circuit through the bottom portion, and
an interface between the bottom portion and the intermediate portion is exposed to the protection space above the vent hole; and
a liquid-impermeable and gas-permeable membrane mounted on an outer surface of the side portion facing the external space to cover the vent hole to allow fuel vapor to be discharged from the vent hole to the external space and to restrict liquid from entering the vent hole from the external space.

2. The tank lid unit according to claim 1,
wherein the drive circuit is located to be distant from the bottom portion above an exposed location of the protection space to which the interface is exposed,
wherein a separation distance of a topmost portion of the vent hole with respect to a lowermost inner surface of the bottom portion is smaller than half of a separation distance of the drive circuit with respect to the lowermost inner surface, and
wherein a separation distance of the exposed location with respect to the lowermost inner surface is larger than half of the separation distance of the drive circuit with respect to the lowermost inner surface.

3. The tank lid unit according to claim 1,
wherein the drive circuit is provided at a separation location distant from the bottom portion above the exposed location of the protection space to which the interface is exposed, and
wherein the terminal is electrically connected to the drive circuit at the separation location.

4. The tank lid unit according to claim 1,
wherein the bottom portion includes an extension portion which extends further upward than the lowermost inner surface facing the protection space, and
wherein the exposed location of the interface between the intermediate portion and the extension portion of the protection space is further above the lowermost inner surface than the vent hole.

5. The tank lid unit according to claim 1,
wherein an opening area of the vent hole on the external space side is smaller than the opening area of the vent space.

6. The tank lid unit according to claim 1,
wherein the bottom portion includes a rib portion which divides the vent space and is connected to the lid main body portion, and
wherein the intermediate portion passes through the rib portion.

7. The tank lid unit according to claim 1,
wherein the terminal includes a plurality of specific terminals distant from each other,
wherein a protrusion wall portion of the bottom portion, which protrudes further upward than the exposed location of the interface between the intermediate portion of the specific terminal and the bottom portion in the protection space, is provided between the specific terminals.

8. The tank lid unit according to claim 1,
wherein the terminal includes a plurality of specific terminals distant from each other,
wherein a recessed wall portion of the bottom portion, which is recessed further downward than the exposed location of the interface between the intermediate portion of the specific terminal and the bottom portion in the protection space, is provided between the specific terminals.

9. A fuel supply device comprising:
a fuel pump that supplies a fuel from the inside of a fuel tank to the outside of the fuel tank; and
the tank lid unit according to claim 1.

* * * * *